United States Patent
Das et al.

(10) Patent No.: US 6,847,004 B2
(45) Date of Patent: Jan. 25, 2005

(54) PROCESS OF REMOVING A CERAMIC COATING DEPOSIT IN A SURFACE HOLE OF A COMPONENT

(75) Inventors: Nripendra Nath Das, West Chester, OH (US); Mark Samuel Bailey, Fairfield, OH (US); Clarence Albert Ash, Burlington, KY (US); Thomas John Tomlinson, West Chester, OH (US)

(73) Assignee: General Electric Company, Schenectady, NY (US)

( * ) Notice: Subject to any disclaimer, the term of this patent is extended or adjusted under 35 U.S.C. 154(b) by 254 days.

(21) Appl. No.: 10/248,343

(22) Filed: Jan. 10, 2003

(65) Prior Publication Data

US 2004/0134897 A1 Jul. 15, 2004

(51) Int. Cl.[7] .............................................. B23K 26/00
(52) U.S. Cl. ............................ 219/121.71; 219/121.7; 219/121.85
(58) Field of Search .................. 219/121.71, 121.7, 219/121.85

(56) References Cited

U.S. PATENT DOCUMENTS

| | | | | |
|---|---|---|---|---|
| 4,818,834 A | * | 4/1989 | Rupert | 219/69.17 |
| 5,216,808 A | * | 6/1993 | Martus et al. | 29/889.1 |
| 5,465,780 A | * | 11/1995 | Muntner et al. | 164/516 |
| 6,172,331 B1 | | 1/2001 | Chen | 219/121.71 |
| 6,380,512 B1 | | 4/2002 | Emer | 219/121.71 |
| 6,420,677 B1 | | 7/2002 | Emer et al. | 219/121.71 |
| 6,441,341 B1 | * | 8/2002 | Steibel et al. | 219/121.71 |

* cited by examiner

Primary Examiner—M. Alexandra Elve
(74) Attorney, Agent, or Firm—David L. Narciso; Gary M. Hartman; Domenica N. S. Hartman

(57) ABSTRACT

A process of removing ceramic deposits from a surface hole in a component, a particular example being portions of a ceramic coating deposited on a surface of a component equipped with cooling holes. The process makes use of a pulsed Nd:YAG laser operated with parameters that avoid delamination, cracking or otherwise damaging a ceramic coating surrounding a cooling hole. The laser is operated to generate a laser beam that removes some of the ceramic deposit from the hole while a residual portion of the ceramic deposit remains surrounding the hole to define a surface opening.

20 Claims, 1 Drawing Sheet

PROCESS OF REMOVING A CERAMIC COATING DEPOSIT IN A SURFACE HOLE OF A COMPONENT

BACKGROUND OF INVENTION

1. Field of the Invention

The present invention generally relates to ceramic coatings deposited on components with surface holes that are required to remain open after the coating process. More particularly, this invention is directed to a method of removing ceramic coating deposits from surface holes using a laser drilling technique having parameters that reduce the incidence of delamination and cracking of the ceramic coating surrounding the surface hole.

2. Description of the Related Art

Components located in certain sections of gas turbine engines, such as the turbine, combustor and augmentor, are often thermally insulated with a ceramic layer in order to reduce their service temperatures, which allows the engine to operate more efficiently at higher temperatures. These coatings, often referred to as thermal barrier coatings (TBC), must have low thermal conductivity, strongly adhere to the article, and remain adherent throughout many heating and cooling cycles. Coating systems capable of satisfying these requirements typically include a metallic bond coat that adheres the thermal-insulating ceramic layer to the component, forming what may be termed a TBC system. Metal oxides, such as zirconia ($ZrO_2$) partially or fully stabilized by yttria ($Y_2O_3$) magnesia (MgO) or other oxides, have been widely employed as the material for the thermal-insulating ceramic layer. The ceramic layer is typically deposited by air plasma spraying (APS), low pressure plasma spraying (LPPS), or a physical vapor deposition (PVD) technique, such as electron beam physical vapor deposition (EBPVD). Bond coats are typically formed of an oxidation-resistant diffusion coating such as a diffusion aluminide or platinum aluminide, or an oxidation-resistant overlay coating such as MCrAlY (where M is iron, cobalt and/or nickel).

While TBC systems provide significant thermal protection to the underlying component substrate, internal cooling of components such as combustor liners and turbine blades (buckets) and nozzles (vanes) is often necessary, and may be employed in combination with or in lieu of a TBC. Air-cooled components of a gas turbine engine typically require that the cooling air flow is discharged through carefully configured cooling holes that distribute a cooling film over the component surface to increase the effectiveness of the cooling flow. Cooling holes are typically formed by such conventional drilling techniques as electrical-discharge machining (EDM) and laser drilling, or with complex advanced casting practices that yield castings with dimensionally correct openings. However, EDM cannot be used to form cooling holes in a component having an existing ceramic TBC since ceramic is electrically nonconducting. While laser drilling techniques are capable of forming cooling holes in a TBC-coated component, the brittle ceramic TBC surrounding the cooling hole is prone to delamination and cracking of the TBC at the interface between the TBC and the underlying metallic bond coat. Accordingly, cooling holes are often machined by EDM or laser drilling after deposition of the bond coat but prior to application of the TBC. However, the presence of TBC deposits in the cooling holes of an air-cooled component can detrimentally affect the service life of the component as a result of the TBC altering the shape and reducing the size of the cooling hole openings. Particularly for TBC's deposited by plasma spraying (APS and LPPS), a significant amount of ceramic can be deposited in the cooling holes when depositing a sufficiently thick TBC to thermally insulate hot section components. The obstruction of cooling holes with TBC not only occurs with new manufactured air-cooled components, but also when refurbishing a TBC on a component returned from the field.

From the above, it can be seen that manufacturing and refurbishing an air-cooled component protected by a TBC is complicated by the requirement that the cooling holes remain appropriately sized and shaped. Typical solutions are to limit the thickness of the TBC applied or, more preferably, perform a final operation to remove ceramic from the cooling holes in order to reestablish the desired size and shape of the openings. Various techniques have been proposed for this purpose. One approach is to employ a waterjet treatment, a notable example of which is disclosed in commonly-assigned U.S. patent application Ser. No. 10/086,266 to Farmer et al. As cooling hole diameters decrease, generally below 0.020 (about 0.5 mm) and particularly below 0.010 inch (about 0.25 mm), removal of ceramic becomes more difficult with a waterjet, especially for TBC thicknesses in excess of 0.020 (about 0.5 mm). As noted above, while conventional laser drilling techniques tend to delaminate and crack the brittle ceramic TBC surrounding a cooling hole, various laser drilling techniques have been proposed that are reported to minimize TBC damage. Commonly-assigned U.S. Pat. No. 5,216,808 to Martus et al. reports the propensity for Nd:YAG (neodymium-doped yttrium-aluminum-garnet) lasers to damage the ceramic coating surrounding a cooling hole as a result of these lasers generating beams in the infrared (IR) spectrum that thermally remove the ceramic. To avoid this problem, Martus et al. use an Excimer laser, which generates a beam in the ultraviolet spectrum, to a thermally ablate a ceramic coating from a cooling hole. Commonly-assigned U.S. Pat. No. 6,172,331 to Chen further recognizes the propensity for pulsed Nd:YAG lasers to cause TBC cracking, and as a solution utilizes a pulsed Nd:YAG laser in combination with a harmonic generator to reduce the laser beam wavelength to about 532 nanometers, which is shorter than IR wavelengths. Finally, U.S. Pat. No. 6,380,512 to Emer also discloses the use of a pulsed Nd:YAG laser to remove ceramic from a cooling hole. Emer does not alter the wavelength of the Nd:YAG laser beam used to remove the ceramic, but instead uses the laser beam at its standard IR wavelength of 1060 nm. Emer does not disclose modifying a pulsed IR laser beam to avoid the delamination and cracking of the TBC that has been reported by others in the prior art. Instead, Emer reports that the precise actual location of a cooling hole is required to effectively redrill a coated hole without damage to the component. For this purpose, Emer uses a CNC program to originally install the cooling holes and then preliminarily locate the holes for redrilling, but then requires a machine vision system to more precisely identify the actual location of the cooling holes on the component surface.

SUMMARY OF INVENTION

According to the present invention, there is provided a process of removing ceramic deposits from a surface hole in a component, a particular example being portions of a ceramic coating material deposited on a surface of an air-cooled gas turbine engine component. The process is particularly effective in removing a TBC material deposited in a cooling hole of a component as a result of coating a surface of the component with the TBC material, in which the deposit is removed from the cooling hole without damaging the cooling hole or the TBC surrounding the cooling hole on the coated surface of the component.

The process of this invention makes use of a pulsed Nd:YAG laser operated with parameters that enable the laser beam to remove ceramic material from a cooling hole without delaminating, cracking or otherwise damaging the TBC surrounding the cooling hole, and without any special equipment or efforts to precisely identify the hole location. Instead, the present invention is able to make use of the same fixturing and programming used to originally install the cooling holes. To enable the use of more relaxed positioning requirements, the pulsed Nd:YAG laser is operated in a free-running mode at relatively lower power levels and higher frequencies that conventionally used. These parameters include a pulse frequency of about 2 to about 20 Hz and pulse widths of about 0.25 to about 6.0 milliseconds, with preferred parameters being dependent on the hole diameter. In addition, the invention makes use of a laser beam whose diameter is smaller than the cooling hole being redrilled, and the laser is equipped with breakthrough detection so that the beam is not projected onto the hole walls, with the result that the hole entrance after laser drilling is defined by remaining ceramic deposits surrounding the hole and is therefore smaller than the original diameter of the hole at the component surface. The process of this invention is able to remove ceramic from cooling holes with diameters of less than 0.020 (about 0.5 mm) and even below 0.010 inch (about 0.25 mm), and even where the TBC surrounding the hole has a thickness in excess of 0.020 (about 0.5 mm).

In view of the above, a process for removing a ceramic deposit from a surface hole in accordance with this invention includes positioning an Nd:YAG laser generator so that a laser beam generated by the generator is directed at the original programmed location of the hole used during installation of the hole. A pulsed laser beam having a diameter less than the as-installed hole is then directed at the programmed location of the hole to remove the ceramic deposit. The pulsed laser beam has a pulse width and pulse frequency that enables the ceramic deposit to be removed from the hole without substantial delamination or cracking of the ceramic coating surrounding the hole. Because special equipment and efforts are not required to precisely identify the hole location, the process of this invention can be easily implemented while also enabling cooling holes to be redrilled with significantly lower manufacturing costs due to reduced cycle time.

Other objects and advantages of this invention will be better appreciated from the following detailed description.

DETAILED DESCRIPTION

Figure 1:
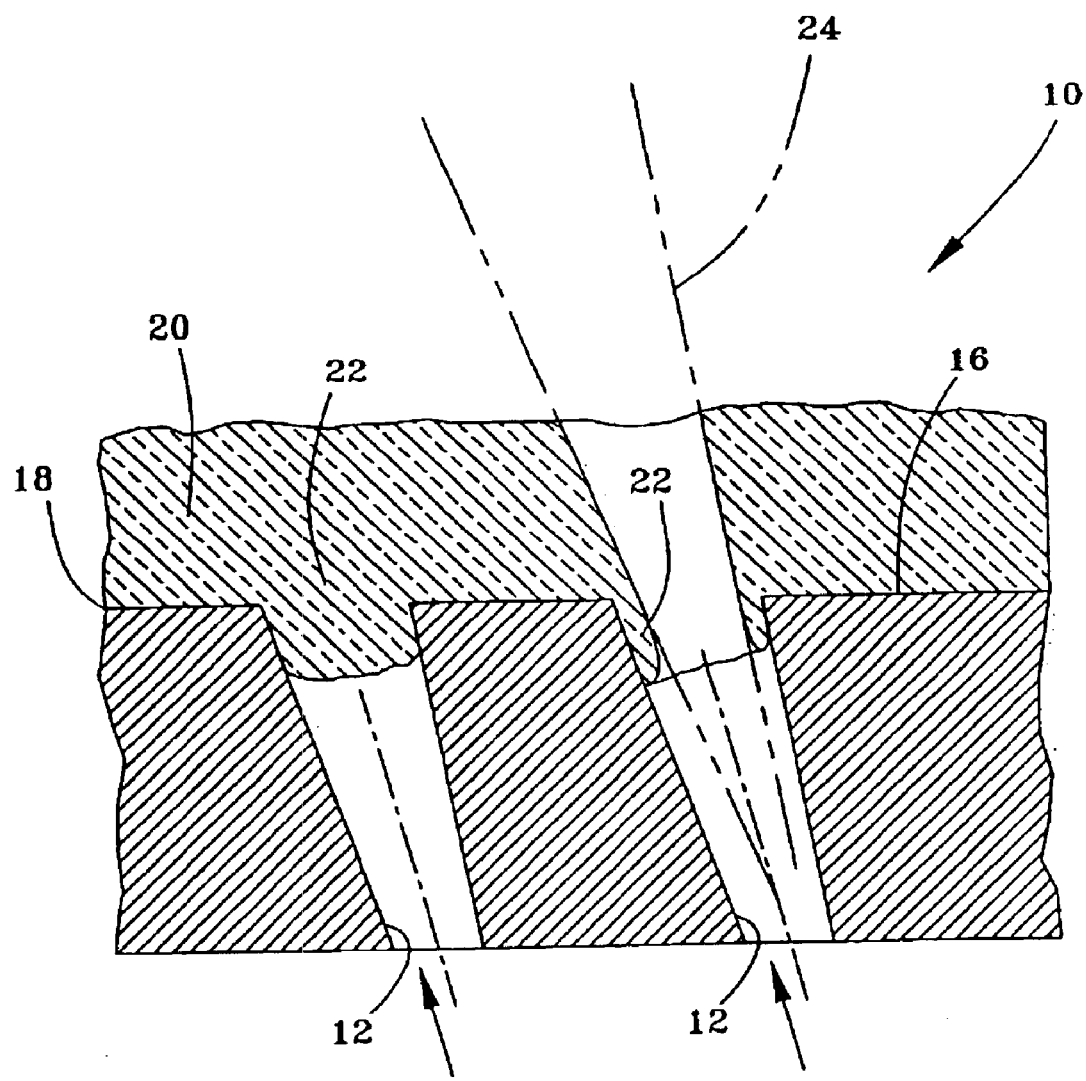
FIG. 1 represents a cross-sectional view of cooling holes before and after removal of a ceramic deposit in accordance with this invention.

FIG. 1 represents a cross-sectional view through cooling holes 12 that intersect a surface 16 of an air-cooled component 10 of a gas turbine engine. The component 10 may be formed of an iron, nickel or cobalt-base superalloy, though other high temperature materials could foreseeably be used. As known in the art, to minimize the service temperature of the component 10, heat is transferred from the component 10 by forcing bleed air through the cooling holes 12 in a direction indicated by the arrows in FIG. 1. The amount of heat transferred to the surface 16 of the component 10 can be further reduced by forming the cooling holes 12 to be disposed at an acute angle relative to the surface 16 of the component 10, so that air discharged from the cooling hole 12 flows over the surface 16 of the component 12. Suitable techniques for forming the holes 12 include EDM or laser drilling, though it is foreseeable that the holes 12 could be formed by such other methods as casting or abrasive water jet machining.

To promote heat transfer from the component 10, the cooling holes 12 are carefully located and configured to maximize their efficiency. For this purpose, the equipment used to form the holes 12 is preferably controlled by a CNC (computer numerical control) machine that operates in accordance with a program written to locate multiple points on the surface 16 where the cooling holes 12 are desired. These spatial measurements are stored in machine coordinates on a PC, and are therefore accessible for accurately locating cooling holes on a second component fixtured in essentially an identical manner. The CNC machine is also preferably programmed to automatically set up the desired drilling parameters, such as power, pulse width and frequency if the holes 12 are formed by laser drilling, so that minimal operator intervention is required to perform set-up for each component to be processed. The use of CNC equipment to drill cooling holes in gas turbine engine components is well known to those skilled in the art, and therefore will not be discussed in any further detail.

The component 10 is represented in FIG. 1 as having a ceramic coating (i.e., TBC) 20 deposited on its surface 16. The coating 20 is bonded to the surface 16 with a metallic bond coat 18, which with the ceramic coating 20 defines a thermal barrier coating (TBC) system. Particularly suitable bond coat materials include diffusion aluminide and/or MCrAlY overlay coatings, while a suitable TBC material is zirconia partially stabilized with yttria (yttria-stabilized zirconia, or YSZ), though zirconia fully stabilized with yttria could be used, as well as zirconia stabilized by other oxides, such as magnesia (MgO), calcia (CaO), ceria (CeO$_2$) or scandia (Sc$_2$O$_3$). The cooling holes 12 are shown as containing a ceramic deposit 22 adhered to their walls as a result of the process by which the ceramic coating 20 was deposited. FIG. 1 schematically represents the coating 20 as being deposited by plasma spraying, such as air plasma spraying (APS) or low pressure plasma spraying (LPPS), though other deposition processes could be used. To apply the coating 20, the component 10 can be positioned on a conventional turntable, and a suitable spray apparatus located adjacent the turntable is used to apply the coating material as the component 10 is rotated. Following the coating operation, the component 10 is preferably heat treated in a vacuum to reduce residual stresses in the ceramic coating 20. Suitable heat treatment parameters include a treatment temperature of about 1025° C. to about 1125° C. maintained for a duration of about two to about eight hours.

FIG. 1 shows the coating 20 as being much thicker than the diameter of the cooling holes 20, which increases the likelihood that the ceramic deposits 22 will completely block the cooling holes 12, as represented by the cooling hole 12 on the lefthand side of FIG. 1. For example, the cooling holes 12 may have diameters of less than about 0.030 inch (about 0.75 mm), such as about 0.020 (about 0.50 mm) or less, and possibly less than 0.010 inch (about 0.25 mm), while it may be desirable for the coating 20 to be deposited to thicknesses of greater than 0.020 inch (about 0.50 mm), such as 0.030 inch (about 0.75 mm) or more.

Whether the component 10 is newly manufactured or has been returned from the field, because the cooling holes 12 were formed first, the ceramic deposits 22 must be removed from the cooling holes 12 to reestablish the desired diameter and shape of the holes 12, as represented by the cooling hole 12 on the righthand side of FIG. 1. According to the invention, the ceramic deposits 22 within the cooling holes 12 are removed with an Nd:YAG laser generator without damaging the component 10 or the coating 20 immediately surrounding the cooling holes 12. For this purpose, an Nd:YAG laser employed by the invention is operated in a free running mode to produce a relatively low power, high frequency pulsed laser beam 24 in the IR spectrum. Preferred parameters are dependent in part on the diameter of the cooling holes 12. If the holes 12 have diameters of less than 0.010 inch (about 0.25 mm), the pulsed laser beam 24 can have a pulse width of about 0.25 to about 6.0 milliseconds and a pulse frequency of about 2 to about 20 Hz, more preferably a pulse width of about 0.55 to about 0.75 milliseconds and a pulse frequency of about 13 to about 17 Hz, with a pulse width of about 0.65 milliseconds and a pulse frequency of about 15 Hz being most preferred. If the holes 12 have diameters of greater than 0.010 inch (about 0.25 mm), the pulsed laser beam 24 should have a pulse width of about 0.4 to about 1.0 milliseconds and a pulse frequency of about 6 to about 16 Hz, with preferable and preferred pulse widths and pulse frequencies being the same as those for holes 12 smaller than 0.010 inch. For these important parameters to fully succeed, the diameter of the laser beam 24 must be sufficiently smaller than the holes 12, and the Nd:YAG laser must be equipped with breakthrough detection of a type known in the art to interrupt the laser beam 24, so that the beam 24 is not projected onto the walls of the holes 12. In FIG. 1, the laser beam 24 can be seen as tapered (via a focusing lens), and the entrance to the hole 12 defined by the remaining ceramic deposit 22 is smaller than the original diameter of the hole 12 at the component surface 16. As such, the original drilled diameter of the holes 12 at the component surface 16 is larger than the diameter desired for the holes 12, which after the laser redrilling process of the invention is established by a surface opening defined by the remaining ceramic deposits 22 surrounding the holes 12.

In the process of removing the ceramic deposits 22 from the cooling holes 12, the component 10 is preferably placed back on the same fixture (or an identical fixture) used to hold the component 10 when the cooling holes 12 were originally installed. The data used by the CNC program to locate the holes 12 can then be used to relocate the cooling holes 12 on the component 10. As represented in FIG. 1, the pulsed laser beam 24 is then directed at the entrance of the hole 12, along a trajectory coaxial with the cooling hole 12. Drilling continues until the laser beam 24 breaks through the ceramic deposit 22, at which point the beam 24 is interrupted to limit thermal effects.

In an investigation leading to this invention, cooling holes were first laser drilled and then redrilled in a stage 1 HPT duct segment of a gas turbine engine following TBC deposition. Prior to installing the cooling holes, an overlay bond coat was deposited on the surface of the component by air plasma spraying. An Nd:YAG laser operated with conventional high power, low frequency parameters was then used to drill approximately 0.022 inch (about 0.56 mm) diameter holes in the component. Laser drilling was performed with a CNC machine programmed to locate the cooling holes in the component surface while the component was fixtured. The component then underwent an aluminide coating cycle (about 1875° F. (about 1024° C.) for about five hours). A YSZ TBC was then deposited by air plasma spraying to a thickness of about 0.035 inch (about 0.9 mm), with a result that the cooling holes were completely blocked by the TBC. After heat treating the component at about 1975° F. (about 1080° C.) for about four hours in a vacuum, the component was returned to the laser drilling fixture, and the programmed hole location data was employed to control an Nd:YAG laser. Based only on the programmed hole locations, the Nd:YAG laser was positioned relative to the component and then operated to sequentially project a laser beam into each cooling hole for the purpose of removing the ceramic deposit within the hole. The Nd:YAG laser was operated in a free running mode to generate a pulsed IR laser beam having a pulse width of about 0.65 millisecond and a pulse frequency of about 15 Hz. The beam evaporated the ceramic deposit from each cooling hole until interrupted by a breakthrough detection system. The resulting openings formed by the beam through the ceramic was about 0.018 inch (about 0.46 mm) in diameter. Metallographic examination of the component showed that no significant delamination or cracking of the TBC had occurred around the cooling holes.

While the invention has been described in terms of a preferred embodiment, it is apparent that other forms could be adopted by one skilled in the art. For example, the process of this invention could be performed on coated articles other than a gas turbine engine component, and ceramic coating materials other than those mentioned could be removed with the laser drilling process of this invention. Therefore, the scope of the invention is to be limited only by the following claims.

What is claimed is:

1. A process of removing a ceramic deposit from a surface hole of a component having a ceramic coating on a surface thereof, the process comprising the steps of:
    positioning an Nd:YAG laser generator so that a laser beam generated by the generator is directed at the programmed location of the hole used during installation of the hole; and then
    directing a pulsed laser beam at the programmed location of the hole to remove the ceramic deposit from the hole, the pulsed laser beam having a diameter less than the hole at the surface of the component, a pulse width of about 0.25 to about 6.0 milliseconds, and a pulse frequency of about 2 to about 20 Hz,
    wherein some of the ceramic deposit is removed from the hole and a residual portion of the ceramic deposit remains surrounding the hole to define a surface opening without substantial delamination or cracking of the ceramic coating surrounding the hole.

2. A process according to claim 1, wherein the ceramic coating has a thickness of greater than 0.5 mm.

3. A process according to claim 1, wherein the ceramic coating has a thickness of greater than 0.75 mm.

4. A process according to claim 1, wherein the hole has a diameter of greater than 0.25 mm and the pulsed laser beam has a pulse width of about 0.4 to about 1.0 milliseconds and a pulse frequency of about 6 to about 16 Hz.

5. A process according to claim 1, wherein the hole has a diameter of less than 0.25 mm.

6. A process according to claim 1, further comprising the steps of:
    prior to the positioning step, installing the hole in the component at the programmed location of the hole; and then
    depositing the ceramic coating on the surface and the deposit in the surface hole.

7. A process according to claim 1, wherein removal of the deposit is by thermal evaporation.

8. A process according to claim 1, wherein the ceramic coating is deposited by plasma spraying.

9. A process according to claim 1, wherein the component is a gas turbine engine component.

10. A process of forming cooling holes that intersect a surface of an air-cooled gas turbine engine component, the process comprising the steps of:

installing the holes in the component at programmed locations for the holes;

depositing a ceramic coating on the surface of the component so as to also deposit a ceramic deposit in the hole;

heat treating the component in a vacuum to reduce residual stresses in the ceramic coating;

positioning an Nd:YAG laser generator so that a laser beam generated by the generator is directed at one of the programmed locations of one of the holes; and then directing a pulsed laser beam at the programmed location of the hole to evaporate the ceramic deposit from the hole, the pulsed laser beam being focused to have a diameter less than the diameter of the hole at the surface of the component, the pulsed laser beam having a pulse width of about 0.25 to about 6.0 milliseconds and a pulse frequency of about 2 to about 20 Hz, wherein some of the ceramic deposit is removed from the hole and a residual portion of the ceramic deposit remains surrounding the hole to define a surface opening without substantial delamination or cracking of the ceramic coating surrounding the hole.

11. A process according to claim 10, further comprising the step of, prior to the depositing step, depositing a metallic bond coat on the surface of the component, wherein the ceramic coating is deposited on the bond coat.

12. A process according to claim 11, wherein the bond coat is a diffusion aluminide.

13. A process according to claim 10, wherein the ceramic coating is deposited by plasma spraying.

14. A process according to claim 10, wherein the heat treating step is performed at a temperature of about 1025° C. to about 1125° C. for about two to about eight hours.

15. A process according to claim 10, wherein the ceramic coating has a thickness of greater than 0.5 mm.

16. A process according to claim 10, wherein the ceramic coating has a thickness of greater than 0.75 mm.

17. A process according to claim 10, wherein the holes have diameters of greater than 0.25 mm and the pulsed laser beam has a pulse width of about 0.55 to about 0.75 milliseconds and a pulse frequency of about 13 to about 17 Hz.

18. A process according to claim 17, wherein the pulsed laser beam has a pulse width of about 0.65 milliseconds and a pulse frequency of about 15 Hz.

19. A process according to claim 10, wherein the holes have diameters of less than 0.25 mm and the pulsed laser beam has a pulse width of about 0.55 to about 0.75 milliseconds and a pulse frequency of about 13 to about 17 Hz.

20. A process according to claim 19, wherein the pulsed laser beam has a pulse width of about 0.65 milliseconds and a pulse frequency of about 15 Hz.

* * * * *